US012528481B2

(12) United States Patent
Nakada et al.

(10) Patent No.: US 12,528,481 B2
(45) Date of Patent: Jan. 20, 2026

(54) APPARATUS SYSTEM

(71) Applicant: HONDA MOTOR CO., LTD., Tokyo (JP)

(72) Inventors: Yasuhiro Nakada, Wako (JP); Takayuki Enomoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 17/980,086

(22) Filed: Nov. 3, 2022

(65) Prior Publication Data
US 2023/0202496 A1    Jun. 29, 2023

(30) Foreign Application Priority Data

Dec. 27, 2021  (JP) ................................. 2021-212844

(51) Int. Cl.
| | |
|---|---|
| *B60W 50/06* | (2006.01) |
| *B60W 10/06* | (2006.01) |
| *B60W 10/08* | (2006.01) |
| *B60W 20/15* | (2016.01) |

(52) U.S. Cl.
CPC ............ *B60W 50/06* (2013.01); *B60W 10/06* (2013.01); *B60W 10/08* (2013.01); *B60W 20/15* (2016.01)

(58) Field of Classification Search
CPC ...... B60W 50/06; B60W 10/06; B60W 10/08; B60W 20/15; B60W 2710/0677; B60W 2710/086; B60W 20/10; G06F 8/65; G06F 8/71
See application file for complete search history.

(56) References Cited

U.S. PATENT DOCUMENTS

| | | | |
|---|---|---|---|
| 2014/0297154 A1* | 10/2014 | Yamamoto | B60R 25/04 |
| | | | 701/99 |
| 2020/0398780 A1* | 12/2020 | Kobayashi | A01B 69/008 |
| 2021/0170870 A1* | 6/2021 | Oh | B60K 17/354 |
| 2021/0349709 A1 | 11/2021 | Nakatsukasa et al. | |
| 2022/0001851 A1* | 1/2022 | Namba | F02D 15/02 |
| 2022/0001852 A1* | 1/2022 | Kageura | B60W 20/12 |

(Continued)

FOREIGN PATENT DOCUMENTS

| | | |
|---|---|---|
| JP | 2012-91754 A | 5/2012 |
| JP | 2017-61278 A | 3/2017 |

(Continued)

OTHER PUBLICATIONS

Japanese Office Action issued Sep. 19, 2023 in corresponding Japanese application No. 2021-212844; English machine translation included (8 pages).

*Primary Examiner* — Anne Marie Antonucci
*Assistant Examiner* — Luis G Del Valle
(74) *Attorney, Agent, or Firm* — Rankin, Hill & Clark LLP

(57) ABSTRACT

An apparatus system includes: a plurality of driving sources, each including a driving source control device; and an integrated control device that controls the respective driving source control devices of the plurality of driving sources, wherein the integrated control device, based on an operational situation of each of the plurality of driving sources, causes the plurality of driving sources to perform complementary operation to each other, and performs updating of a control program of each of the driving source control devices of the plurality of driving sources.

3 Claims, 4 Drawing Sheets

(56) References Cited

U.S. PATENT DOCUMENTS

2022/0379804 A1* 12/2022 Sakurada ................ B60L 53/63
2023/0199450 A1*  6/2023 Tam ........................ H04L 47/50
                                                              701/1

FOREIGN PATENT DOCUMENTS

| JP | 2018-156638   | 10/2018 |
| JP | 2021-105923 A |  7/2021 |
| WO | 2020/003515 A1 |  1/2020 |

* cited by examiner

APPARATUS SYSTEM

INCORPORATION BY REFERENCE

The present application claims priority under 35 U.S.C. § 119 to Japanese Patent Application No. 2021-212844 filed on Dec. 27, 2021. The content of the application is incorporated herein by reference in its entirety.

BACKGROUND OF THE INVENTION

Field of the Invention

The present invention relates to an apparatus system.

Description of the Related Art

When a control program of a control device that controls an apparatus is to be updated, the apparatus generally needs to be stopped.

Conventionally, a technique has been disclosed in which for an information processing device, a plurality of storage areas are prepared, the same control programs are stored in the storage areas, and substituted processing is performed during a system update (see Japanese Patent Laid-Open No. 2018-156638).

However, in an apparatus system including a plurality of driving sources and control devices that control the driving sources, when a control program for each driving source is updated for a system update, each driving source itself needs to be restarted, and the entire apparatus system is temporarily stopped. For an apparatus system positioned as part of infrastructure, such as a power generation system or a mobile apparatus such as a vehicle, a stop of the entire apparatus system, even though the stop is temporary, poses a significant problem in terms of efficiency and convenience.

The present invention has been made in view of the above-described circumstances, and an object of the present invention is to efficiently operate an apparatus system, and to enhance convenience.

SUMMARY OF THE INVENTION

An apparatus system includes: a plurality of driving sources, each including a driving source control device; and an integrated control device that controls the respective driving source control devices of the plurality of driving sources, wherein the integrated control device, based on an operational situation of each of the plurality of driving sources, causes the plurality of driving sources to perform complementary operation to each other, and performs updating of a control program of each of the driving source control devices of the plurality of driving sources.

An apparatus system including a plurality of driving sources can be efficiently operated, and convenience can be enhanced.

DETAILED DESCRIPTION OF THE PREFERRED EMBODIMENT

Hereinafter, an embodiment of the present invention is described with reference to the drawings.

EMBODIMENT

Figure 1:
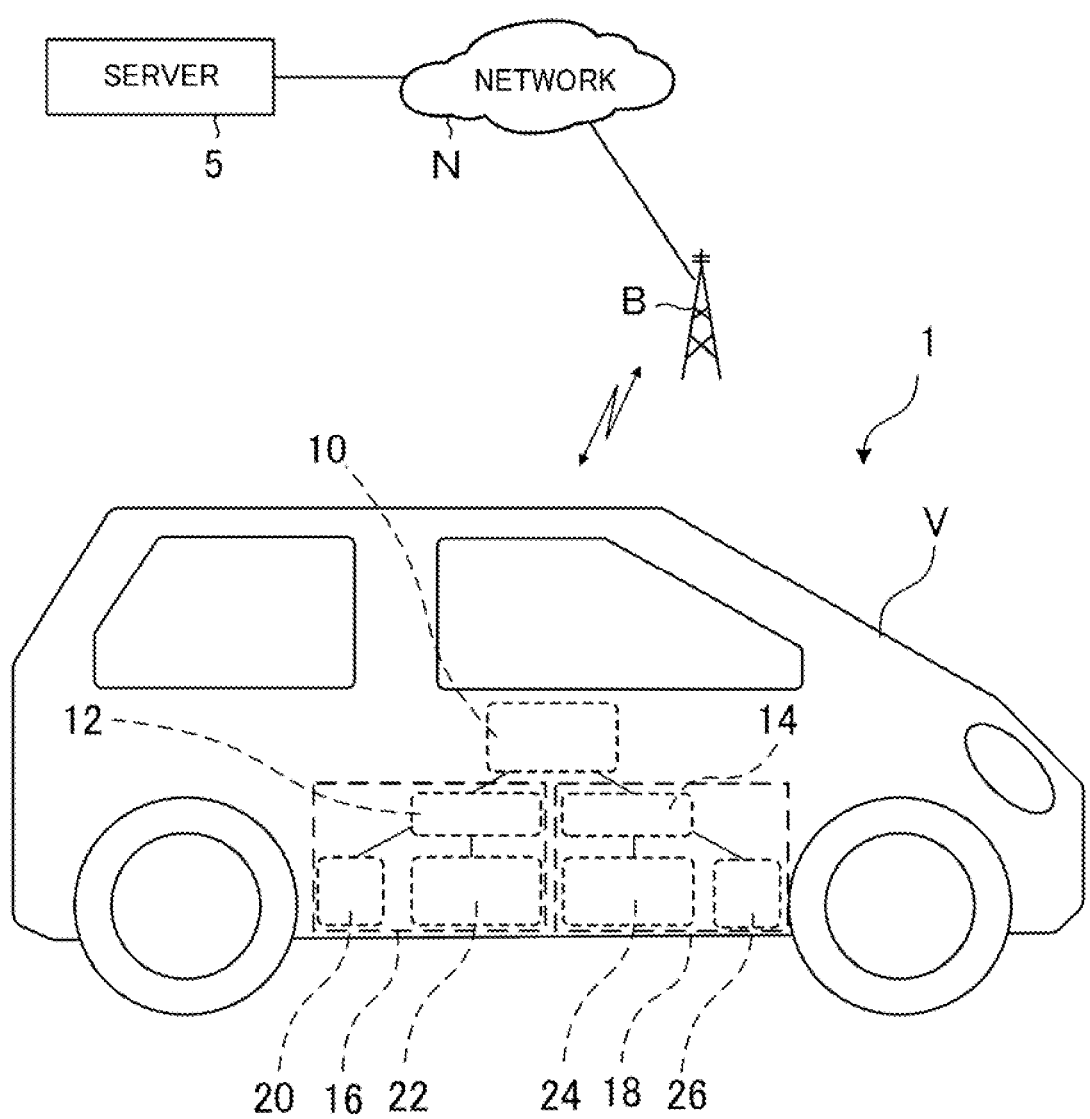
FIG. 1 is a configuration diagram of an apparatus system.

FIG. 1 is a configuration diagram of an apparatus system 1 according to the embodiment of the present invention.

The apparatus system 1 includes a plurality of driving sources, specifically, a first driving source 16 and a second driving source 18. Moreover, the apparatus system 1 includes an integrated control device 10 that controls each of the plurality of driving sources.

The apparatus system 1 is, for example, a vehicle V. Here, the first driving source 16 is an internal combustion engine, and the second driving source 18 is an electric motor.

The internal combustion engine (first driving source) 16 includes a first driving source control device 12, a power unit 22, and a fuel tank 20. The power unit 22 is, for example, an engine. The electric motor (second driving source) 18 includes a second driving source control device 14, a battery 26, and a motor 24. The first driving source control device 12 includes a fuel information acquisition section (not shown) that acquires fuel remaining amount information that is information on how much fuel remains in the fuel tank 20. The second driving source control device 14 includes a battery information acquisition section (not shown) that acquires charge information on the battery 26.

The integrated control device 10 acquires the fuel remaining amount information and the charge information on the battery 26, as well as information on the numbers of revolutions of the respective driving sources and the like, from the first driving source control device 12 and the second driving source control device 14. In other words, the integrated control device 10 acquires respective operational situations of the plurality of driving sources from the respective driving source control devices.

The integrated control device 10 is an information processing device that performs control of the first driving source 16 and the second driving source 18. Specifically, the integrated control device 10 controls the first driving source control device 12 that controls the first driving source 16, and the second driving source control device 14 that controls the second driving source 18.

The integrated control device 10 includes a CPU (Central Processing Unit), a RAM (Random Access Memory), a ROM (Read Only Memory), and the like, and performs various control. The CPU is a processor that implements various functions by executing various programs stored in a memory. The RAM is used for a work area and a storage area for the CPU, and the ROM stores an operating system and a program to be executed by the CPU.

The first driving source control device 12 and the second driving source control device 14 each include a CPU (Central Processing Unit), a RAM (Random Access Memory), a ROM (Read Only Memory), and the like, and performs various control.

Control programs used by the first driving source control device 12 and the second driving source control device 14 may be updated online. Specifically, update programs for the control programs may be transmitted wirelessly from a server 5 (server computer) to the integrated control device 10 of the vehicle V via a network N and a base station B.

Figure 2:
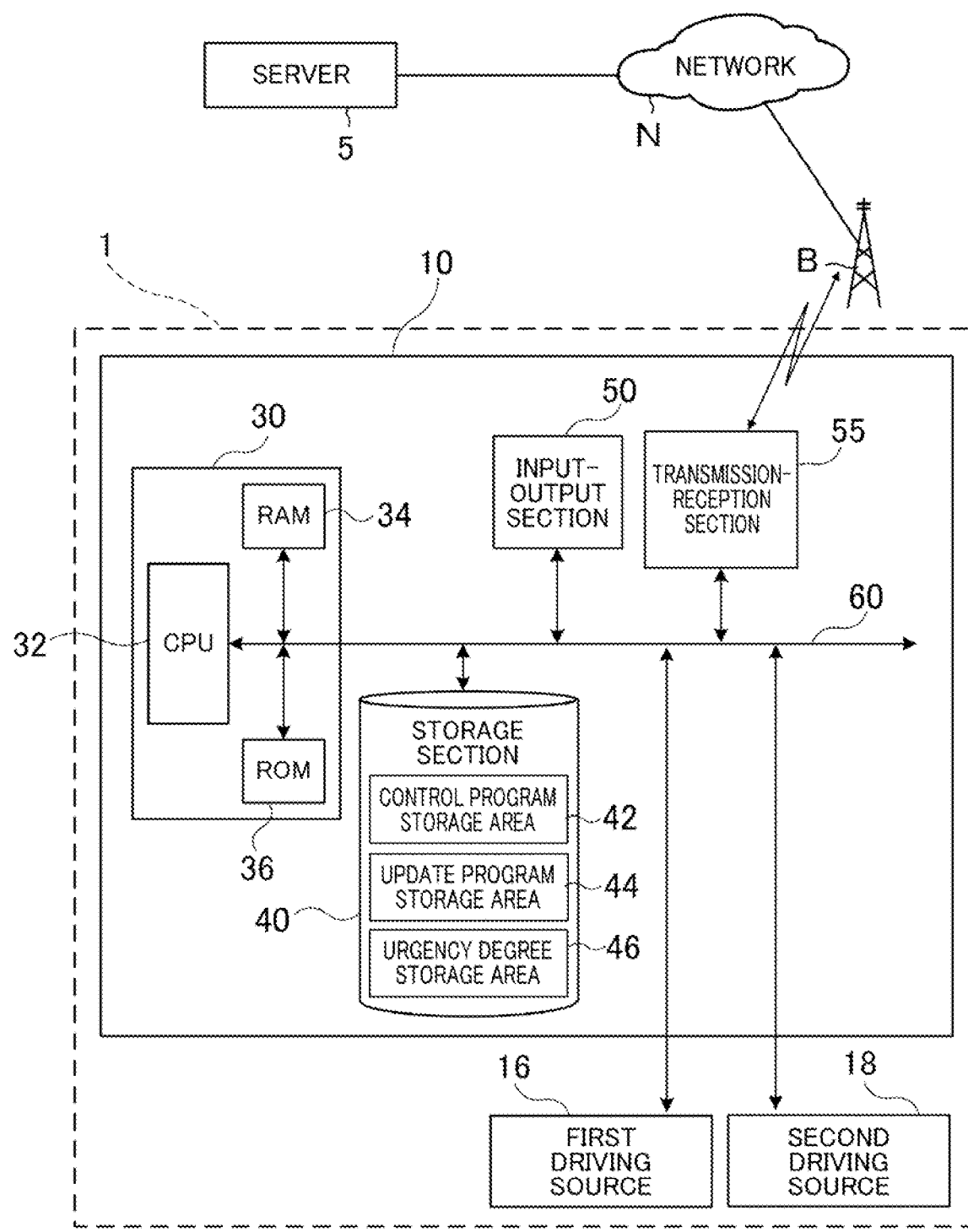
FIG. 2 is a configuration diagram of an integrated control device.

FIG. 2 is a configuration diagram of the integrated control device 10. The integrated control device 10 includes a control section 30 that controls the entire apparatus, a storage section 40 (memory) that stores data, an input-output section 50 (touch panel display, microphone, speaker) that receives information as input and outputs information, and a transmission-reception section 55 (transmitter and receiver) including an interface circuit that transfers data between the CPU and another device, and the sections are connected to each other through a bus 60. The input-output section 50 is a touch panel display. The input-output section 50 can include a microphone as an input device and a speaker as an output device.

The integrated control device 10, the first driving source 16, and the second driving source 18 are connected through, for example, a CAN (Controller Area Network).

The control section 30 includes the CPU 32 (processor), the RAM 34, and the ROM 36. The storage section 40 includes a control program storage area 42 that stores a control program and the like of the integrated control device 10, and an update program storage area 44 that stores update programs for the control programs of the first driving source control device 12 and the second driving source control device 14. Moreover, the storage section 40 includes an urgency degree storage area 46 that stores information on a degree of urgency of each update program. For example, the storage section 40 may be an HDD (Hard Disk Drive) or an SSD (Solid State Device).

Figure 3:
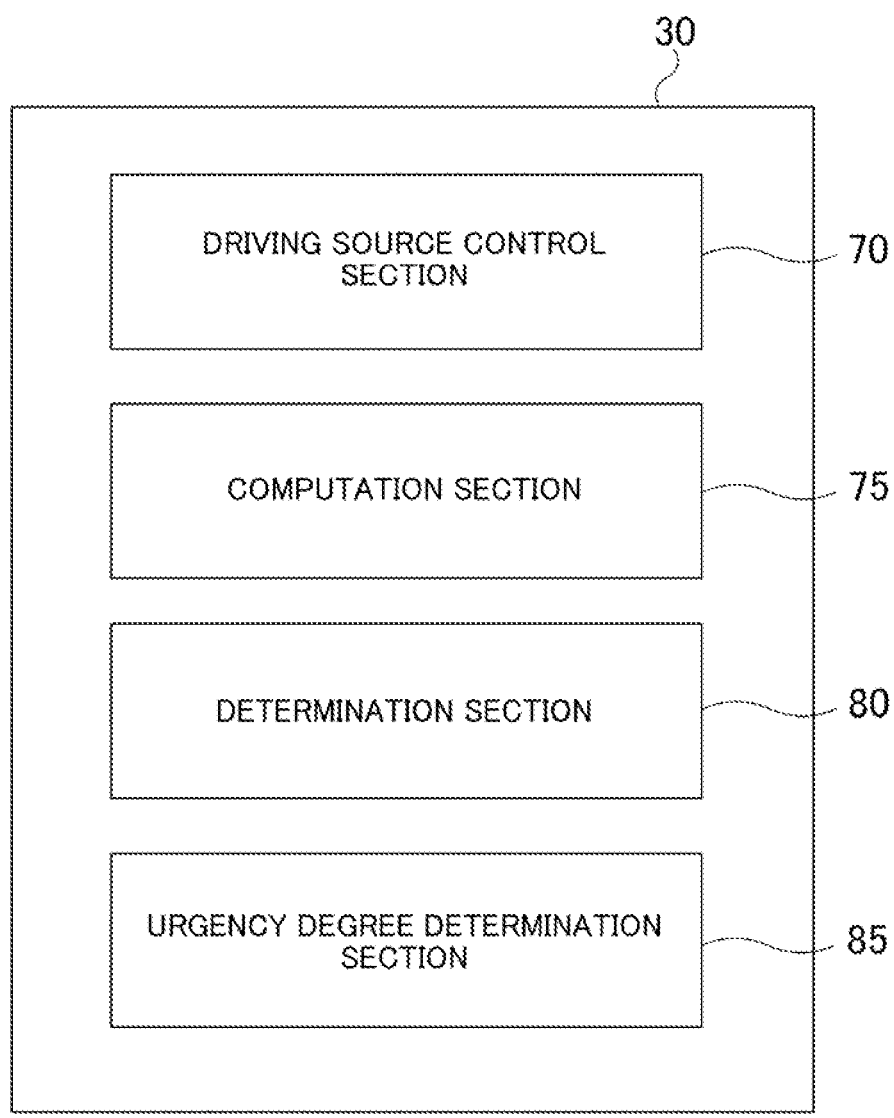
FIG. 3 is a functional block diagram of the integrated control device.

FIG. 3 is a functional block diagram of the control section 30 included in the integrated control device 10. The CPU 32 implements functionality of a driving source control section 70 by executing a control program stored in the control program storage area 42 of the storage section 40.

Moreover, by executing a program stored in the storage section 40, the CPU 32 implements functionality of a computation section 75 that acquires, for example, the remaining amount information on the fuel tank 20, performs computation, and obtains, for example, a travelable distance or a duration for which individual operation is possible. By executing a program stored in the storage section 40, the CPU 32 implements functionality of a determination section 80 that determines, for example, whether or not the first driving source 16 and the second driving source 18 are in a state of being able to complement to each other. Moreover, by executing a program stored in the storage section 40, the CPU 32 implements functionality of an urgency degree determination section 85 that determines what degree of urgency there is about execution of an update program for each control program.

Figure 4:
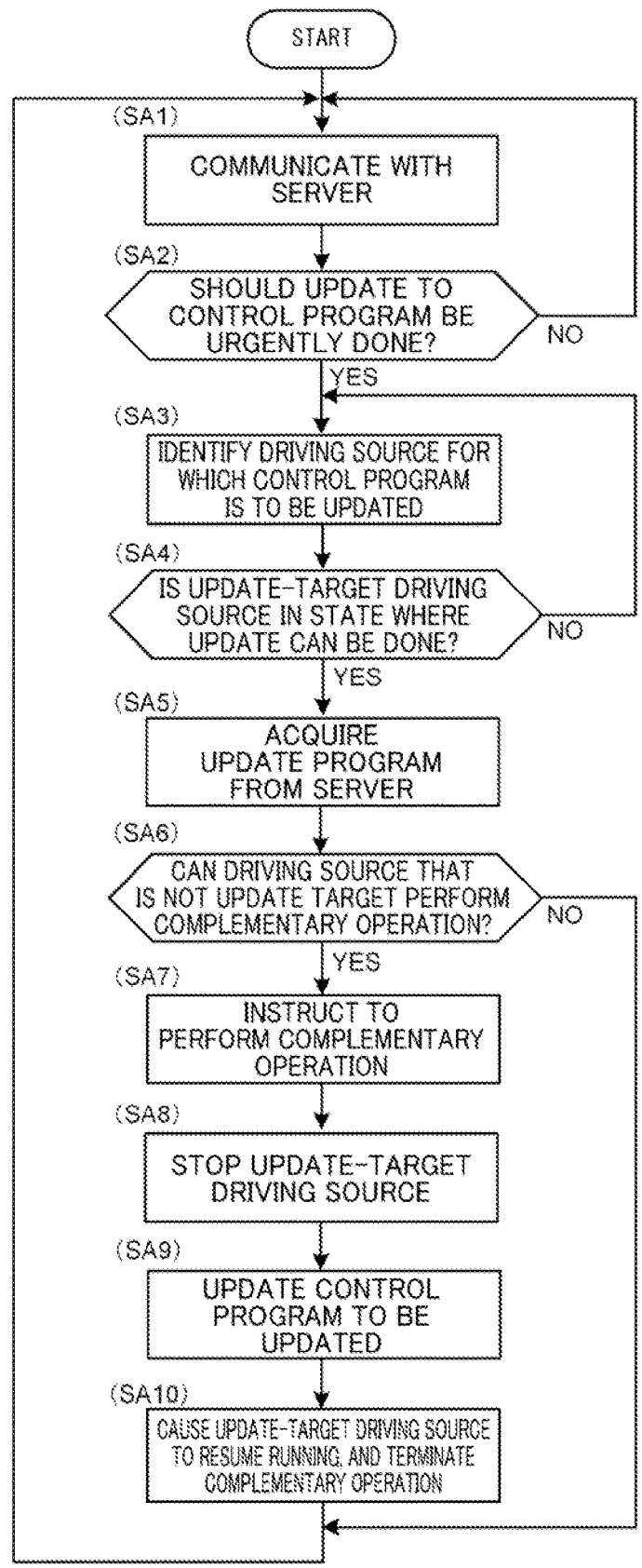
FIG. 4 is a flowchart of processing for control program updating operation and processing for complementary operation by driving sources.

FIG. 4 is a flowchart regarding control program updating operation and complementary operation by driving sources, in the integrated control device 10.

The integrated control device 10 communicates with the server 5, and checks whether or not there is an update to a control program (step SA1). The urgency degree determination section 85 determines a degree of urgency of the update to the control program (step SA2). At the time, the information on degrees of urgency stored in the urgency degree storage area 46 may be referred to. For example, a required output that the apparatus system 1 is required to produce as a whole, an output of the first driving source 16, an output of the second driving source 18, and the like may be used for criteria of determination. When the urgency degree determination section 85 determines that the update should be urgently done (step SA2: YES), an update-target driving source for which the control program is to be updated is identified (step SA3). The determination section 80 determines whether or not the update-target driving source is in a state where the control program can be updated (step SA4). When the update-target driving source is in the state where the update can be done (step SA4: YES), the integrated control device 10 acquires an update program from the server 5 and stores the update program in the update program storage area 44 (step SA5). Next, the determination section 80 determines whether or not a driving source that is not the update target can perform complementary operation (step SA6).

Here, the complementary operation is an operation for complementation performed, when one driving source of the plurality of driving sources is stopped, by increasing the output of the other driving source in order to achieve the output that the apparatus system 1 is required to produce as a whole.

Specifically, for example, when the one driving source, which is the update target, is the first driving source 16 and the other driving source is the second driving source 18, the determination section 80 determines whether or not the required output can be produced by the second driving source 18 for a predetermined time period even if the first driving source 16 is stopped. In other words, the determination section 80 determines whether or not energy is charged in the battery 26 for the second driving source 18 to produce sufficient output for the time period that begins when the first driving source 16 is stopped and lasts until driving is resumed after the control program of the first driving source control device 12 is updated. As a matter of course, when, conversely, the one update-target driving source is the second driving source 18 and the other driving source is the first driving source 16, the determination section 80 may determine whether or not the required output can be produced by the first driving source 16 for the predetermined time period even if the second driving source 18 is stopped. In other words, the determination section 80 may determine whether or not fuel remains in the fuel tank 20 for the first driving source 16 to produce sufficient output for the time period that begins when the second driving source 18 is stopped and lasts until driving is resumed after the control program of the second driving source control device 14 is updated. In other words, the integrated control device 10 causes the plurality of driving sources to perform complementary operation to each other, and updates a control program of each of the driving source control devices of the plurality of driving sources, based on the operational situations of the plurality of driving sources.

It is determined by the urgency degree determination section 85 which driving source is first stopped and the control program is updated, based on the degree of urgency of the update to each control program acquired from the server 5, which is an external device, and the information stored in the urgency degree storage area 46.

When the determination section 80 determines that the complementary operation can be performed by the driving source that is not the update target (step SA6: YES), the integrated control device 10 instructs the control device of each of the driving sources to perform the complementary operation (step SA7). In other words, for example, when the update target is the first driving source 16, the integrated control device 10 instructs the complementary second driving source 18 to increase output. Next, the integrated control device 10 instructs the control device of the update-target driving source to stop the update-target driving source (step SA8). Through the operations, the integrated control device 10 can stop the update-target driving source for which the control program is to be updated, and then update the control program of the control device of the update-target driving source, without causing a reduction in output of the entire apparatus system 1. The integrated control device 10 updates the control program for the update-target driving source (step SA9). Thereafter, the integrated control device 10 causes the update-target driving source to resume running, returns the output of the driving source that is not the update target to an ordinary state, and terminates the complementary operation (step SA10). Then, the procedure returns to step SA1.

When the urgency degree determination section 85 determines that a state is not that the update to the control program should be urgently done, the procedure returns to step SA1. When the determination section 80 determines that the update-target driving source for which the control program is to be updated is not in the state where the control program can be updated (step SA4: NO), the procedure returns to step SA3. When the determination section 80 determines that the complementary operation cannot be performed by the driving source that is not the update target (step SA6: NO), the procedure returns to step SA1. At the time, existence of the update program, inability to perform complementary operation, and a reason for the inability may be outputted on an output section included in the input-output section 50.

Note that although an aspect is described in the present embodiment in which an update program is stored in the integrated control device 10, and updating is performed by the control device of each driving source, any one of the integrated control device 10 and the control device of each driving source may store an update program.

(Configurations Supported by the Embodiment)

The embodiment supports following configurations.

(Configuration 1) An apparatus system including: a plurality of driving sources, each including a driving source control device; and an integrated control device that controls the respective driving source control devices of the plurality of driving sources, wherein the integrated control device, based on an operational situation of each of the plurality of driving sources, causes the plurality of driving sources to perform complementary operation to each other, and performs updating of a control program of each of the driving source control devices of the plurality of driving sources.

In many cases, a control program for a driving source cannot be updated unless the driving source itself is stopped. However, there are some cases where it is not preferable to stop an entire apparatus system each time a control program is updated. According to the configuration as described above, when an apparatus system includes a plurality of driving sources, and if one driving source of the plurality of driving sources is stopped and complementary operation, such as increasing output of another driving source, is possible, an advantageous effect can be brought about that a control program for the one driving source can be updated while operation of the apparatus system is continued as a whole.

(Configuration 2) The apparatus system according to the configuration 1, wherein the updating is performed based on a degree of update urgency of an update program acquired by the integrated control device from an external device.

Among cases where a control program should be updated, there is a case where the update is very urgent, and there is a case where the update is not so urgent. According to the configuration as described above, a control program can be updated only when the update is very urgent.

(Configuration 3) The apparatus system according to the configuration 1 or 2, wherein the integrated control device includes a determination section that determines whether or not one driving source of the plurality of driving sources is allowed to be stopped, and when the determination section determines that the one driving source is allowed to be stopped, the integrated control device stops the one driving source and updates a control program for controlling the one driving source.

In some cases, even an apparatus system including a plurality of driving sources can be unable to satisfy a required output that the apparatus system is required to produce as a whole if one of the plurality of driving sources is stopped, or the entire apparatus system can stop while one driving source is stopped, due to fuel or the like of the other driving source running out. According to the configuration as described above, since determination can be performed as to whether or not one driving source of the plurality of driving sources is allowed to be stopped, the one driving source can be stopped in order to update the control program, while the required output is satisfied.

(Configuration 4) The apparatus system according to the configuration 3, wherein the integrated control device performs control of causing the one driving source to resume running after the control program is updated for the one driving source, the determination section determines whether or not another driving source of the plurality of driving sources is allowed to be stopped, and when the determination section determines that the other driving source is allowed to be stopped, the integrated control device stops the other driving source and updates a control program for controlling the other driving source.

According to the configuration as described above, for the plurality of driving sources included in the apparatus system, the respective control programs can be updated individually while the required output is satisfied.

Note that the embodiment illustrates one aspect to which the present invention is applied, and the present invention is not limited to the embodiment.

For example, although the vehicle V including the plurality of driving sources, which are an internal combustion engine and an electric motor, is used for the apparatus system 1 in the embodiment, the apparatus system 1 may be, for example, a power generation system.

REFERENCE SIGNS LIST

10 Integrated control device
80 Determination section

What is claimed is:

1. An apparatus system comprising:
a plurality of driving sources, each including a driving source control device; and
an integrated control device that controls the respective driving source control devices of the plurality of driving sources,
wherein
the integrated control device, based on an operational situation of each of the plurality of driving sources, causes the plurality of driving sources to perform complementary operation to each other, and performs updating of a control program of the driving source control device of each of the plurality of driving sources,
the integrated control device comprises a CPU (Central Processing Unit) configured to include a determination section,
the determination section identifies one driving source, of the plurality of driving sources, that is an update-target driving source for which the control program is to be updated, and the determination section determines whether or not an other driving source that is not the update target can perform the complementary operation, the complementary operation is an operation of, when the one driving source is stopped, increasing an output of the other driving source from a predetermined ordinary state, the determination section determines whether or not a required output which the apparatus system is required to produce as a whole can be produced by the other driving source performing the complementary operation of the plurality of driving sources even if the one driving source of the plurality of driving sources is stopped, when the determination section determines that the required output can be produced by the other driving source performing the complementary operation even if the one driving source is stopped, the integrated control device stops the one driving source and updates the control program for controlling the one driving source, and thereafter, the integrated control device causes the one driving source to resume running, returns the output of the other driving source to the predetermined ordinary state, and terminates the complementary operation.

2. The apparatus system according to claim 1, wherein the determination section determines whether or not the required output can be produced by the one driving source even if the other driving source is stopped, and when the determination section determines that the required output can be produced by the one other driving source even if the other driving source is stopped, the integrated control device stops the other driving source and updates the control program for controlling the other driving source.

3. The apparatus system according to claim 1, wherein the updating is performed based on a degree of update urgency of an update program acquired by the integrated control device from an external device.

* * * * *